United States Patent
Jurik et al.

(12) 
(10) Patent No.: US 6,494,488 B1
(45) Date of Patent: Dec. 17, 2002

(54) STEERING COLUMN HAVING MAGNESIUM CAPSULES IN THE UPPER MOUNTING BRACKET

(75) Inventors: Mirjana Jurik, Rochester Hills, MI (US); Jeff Szyskowski, Toledo, OH (US); Thomas Dziegielewski, Rochester Hills, MI (US); John M Stoiber, Oregon, OH (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/666,664

(22) Filed: Sep. 20, 2000

(51) Int. Cl.[7] ................................................ B62D 1/18
(52) U.S. Cl. ...................................... 280/777; 248/548
(58) Field of Search ......................... 280/777; 248/548; 74/492

(56) References Cited

U.S. PATENT DOCUMENTS

| 5,390,955 A | | 2/1995 | Kaliszewski et al. | |
|---|---|---|---|---|
| 5,899,116 A | * | 5/1999 | Armstrong et al. | 280/777 |
| 5,979,860 A | * | 11/1999 | Jurik et al. | 248/548 |
| 6,394,494 B1 | * | 5/2002 | Jurik et al. | 280/777 |

* cited by examiner

*Primary Examiner*—Eric Culbreth
(74) *Attorney, Agent, or Firm*—Ralph E. Smith

(57) ABSTRACT

A steering column mounting bracket is provided with break-away capsules integrally formed therewith from the same material as the mounting bracket allowing the capsules to have a more consistent break-away load and reduce noise within the cabin of a vehicle.

3 Claims, 4 Drawing Sheets

STEERING COLUMN HAVING MAGNESIUM CAPSULES IN THE UPPER MOUNTING BRACKET

FIELD OF THE INVENTION

The present invention relates generally to steering column support structures, and more particularly to a steering column support structure including capsules that securely hold the steering column to the instrument panel without hindering the collapse of the steering column during an accident.

BACKGROUND

It is desirable to have a steering column of a vehicle that is securely attached to the frame of the automobile so as to ensure safe operation thereof for the life of the automobile. Generally, this is accomplished by bolting the steering column to the instrument panel which is further secured to the frame of the automobile. However, it has become desirous to allow for the steering column to disengage from the instrument panel and collapse upon the application of a force during an accident.

It is known in the art to attempt to solve these contradictory goals by using polymer capsules (such as disclosed in commonly assigned U.S. Pat. No. 5,390,955, herein incorporated by reference) to support the mounting bracket of the steering column that are designed in such a way as to break-away under a given force. Thus, the steering column is allowed to axially collapse upon the application of a force in the event of an accident.

However, the polymer capsule may change in shape which can cause the capsules to "creep." This creep may cause buzz/squeak/rattle (BSR) problems which are unwanted during the operation of the vehicle. Furthermore, the polymer capsules can become damaged prior to installation thus requiring the disposal of the part.

SUMMARY OF THE INVENTION

It is an object of the present invention to provide a break-away capsule that will overcome the disadvantages of the prior art polymer capsules. This object will be accomplished by forming the capsule from the same material as the remainder of the steering column mounting bracket. This will allow the capsules to have a more consistent break-away load, not be susceptible to BSR, and not break unintentionally during installation.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
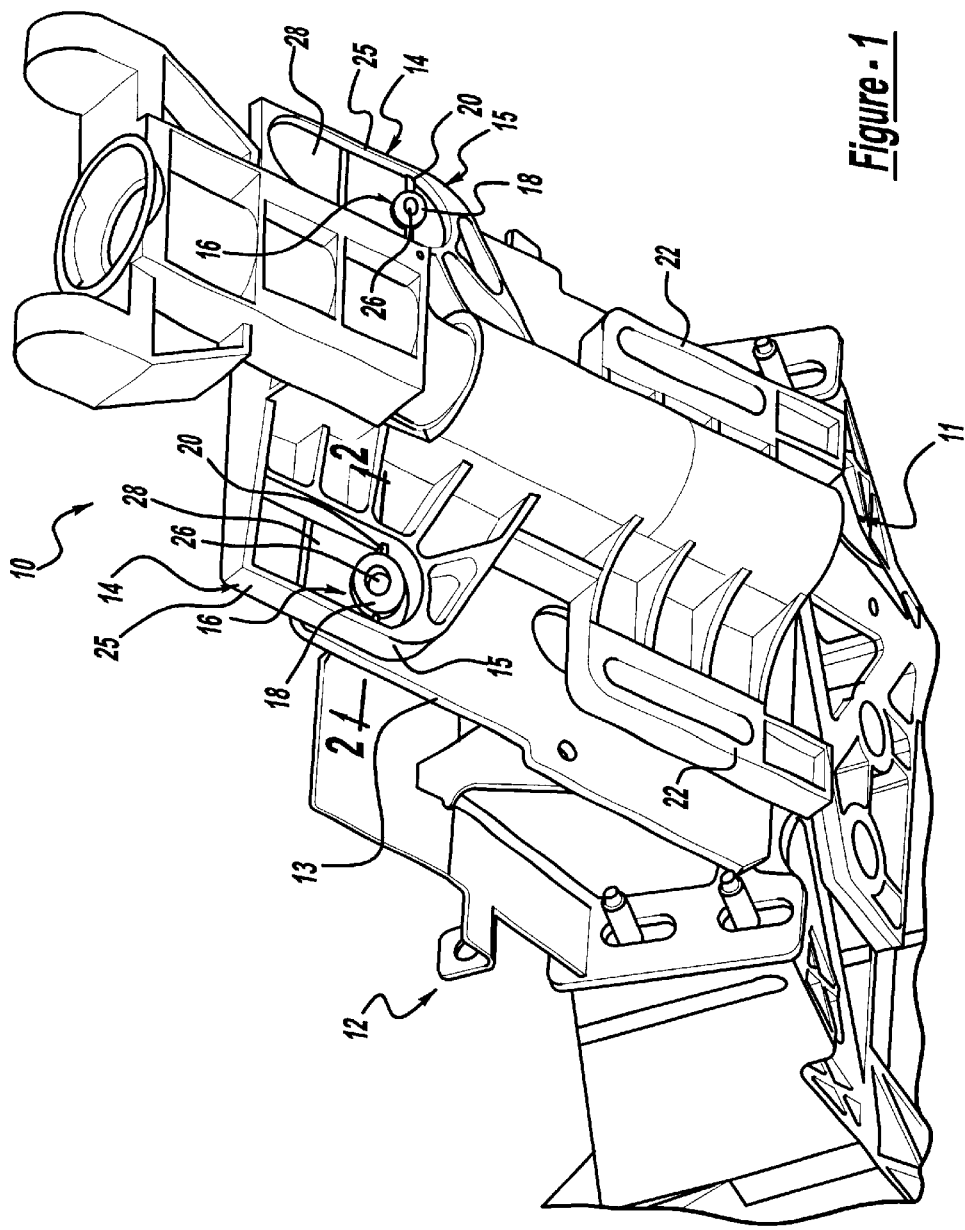
FIG. 1 is a perspective view illustrating the attachment of the steering column mounting bracket to the instrument panel.

FIG. 1 illustrates the mounting bracket 10 in its assembled orientation with the support bracket 13 and the instrument panel 12. However, for illustrative purposes, FIG. 1 does not include the fasteners affixing the mounting bracket 10 to the support bracket 13. Such fasteners are shown in place, in detail, in FIG. 2.

Referring to FIG. 1 the mounting bracket 10 includes a main body 11, a bore 24 extend through the main body 11 for receiving a steering shaft therein (not shown). A pair of rearward flanges 14 and forward flanges 22 are disposed on opposite sides of the main body 11. The rearward flanges 14 include a lower flange body 15 and an upper flange structure 25, which define openings 28. Openings 28 allow limited movement of the mounting bracket 10 relative to the support bracket 13. Break-away capsules 16 are contained within the openings 28. The break-away capsules of the present invention are molded break-away capsules. The break-away capsules 16 include a center body 18 with a pair of outwardly extending tabs 20 interconnected to the lower flange body 15 which defines part of the opening 28. In one embodiment, the mounting bracket and break-away capsules arc made of the same material. In one embodiment, the break-away capsules are further molded as one piece with the mounting bracket. In one embodiment, the breakaway capsules and the mounting bracket are further made of magnesium. A fastener opening 26 is contained within the center body 18. The fastener opening 26 allows for the insertion of fasteners to affix the mounting bracket 10 to the support bracket 13.

Figure 2:
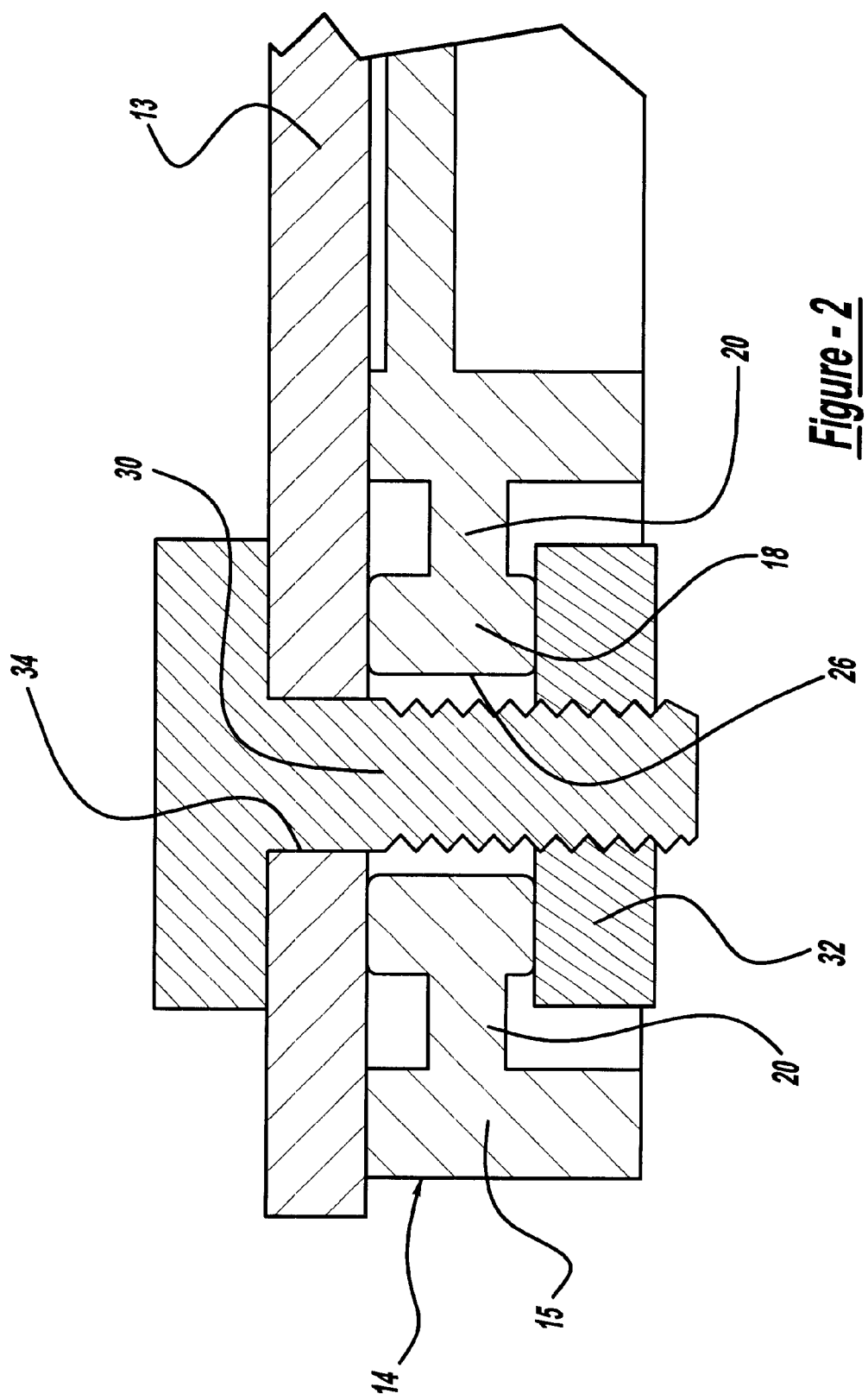
FIG. 2 is a cross-sectional view of the break-away capsules of the mounting bracket affixed to a support bracket of the instrument panel taken along line 2—2 of FIG. 1.

FIG. 2 is a cross-sectional view of a flange 14 of the mounting bracket 10 affixed to the support bracket 13. The center body 18 of the break-away capsule 16 is affixed to the flange 14 through the tabs 20. The tabs 20 may be formed in any shape and size so as to allow for a varied release load. A bolt 30 is inserted through an opening 34 in the support bracket 13, and through the opening 26 in the center body portion 18 of the break-away capsule 16. The bolt 30 is then secured into place with a nut 32. The head of bolt 30 is disposed against support bracket 13 and nut 32 is disposed against breakaway capsule 16. Through this interlock the mounting bracket flange 14 of mounting bracket 10 is affixed to the support bracket 13 through the tabs 20.

Figure 3:
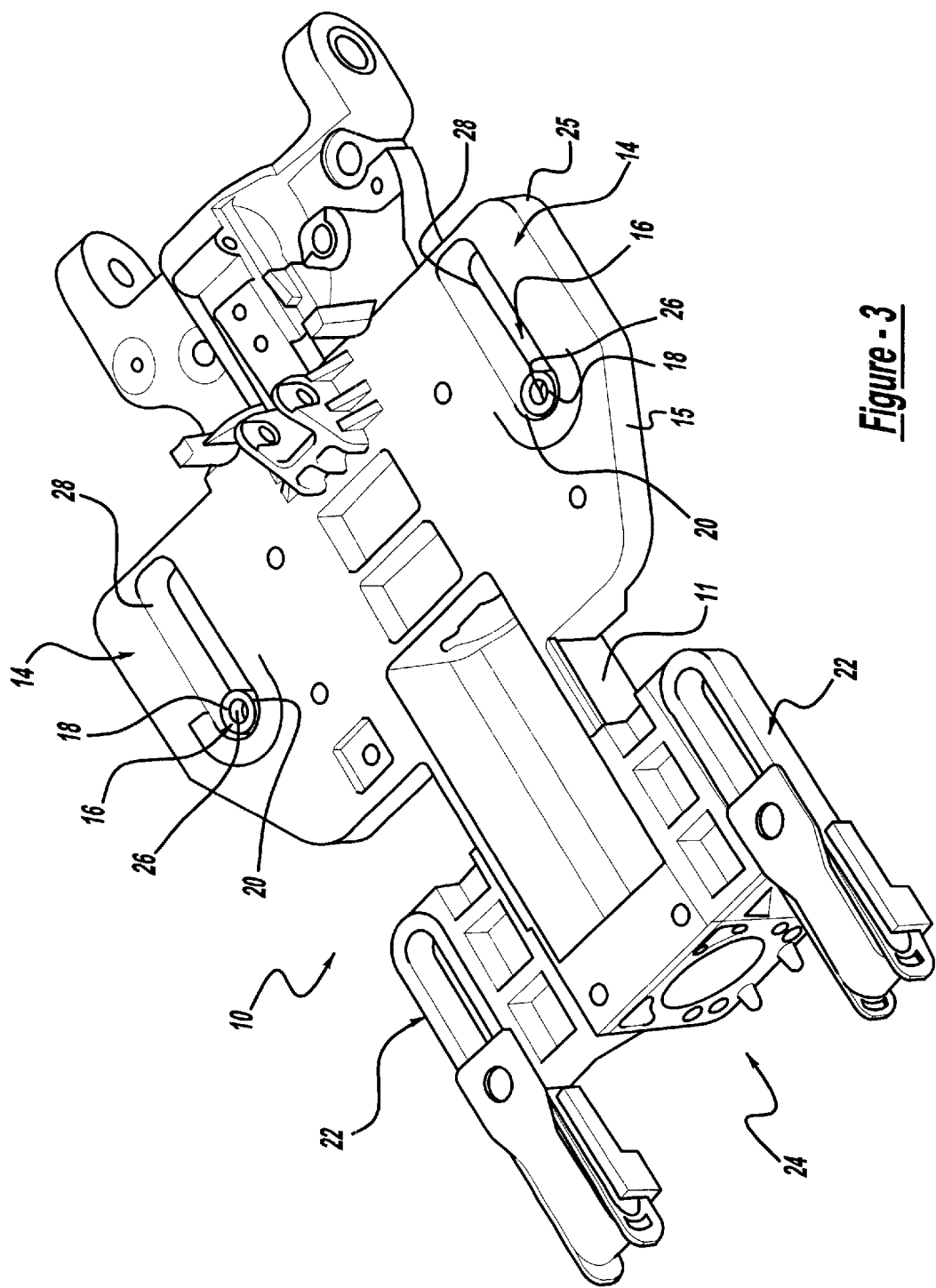
FIG. 3 is a perspective view of a mounting bracket containing four mounting areas with a first embodiment of the present invention.

FIG. 3 illustrates a perspective view from the front side of the mounting bracket 10. The mounting bracket 10 includes a main body 11 and a bore 24 through which a steering shaft (not shown) may be inserted. Formed to the sides of the main body 11 are flanges. Included in this embodiment are forward flanges 22 and rearward flanges 14 placed on opposite sides of the main body 11. Rearward flanges 14 further include an upper flange structure 25 defining an opening 28. Upper flange structure 25 provides a limit to the movement allowed of the mounting bracket 10. Contained within the opening 28 of the rearward flanges 14 are the break-away capsules 16. In this embodiment the center body 18 of the break-away capsule 16 is a relatively small cylinder attached to the flange 14 inside of the opening 28 with tabs 20. The tabs 20 are the portions of the break-away capsule 16 that actually break-away upon the imposition of a large force.

The tabs 20 may be changed in shape, size, and material to achieve the desired break-away resistance. When the tabs 20 are broken the mounting bracket 10 is free to move along its axis.

Figure 4:
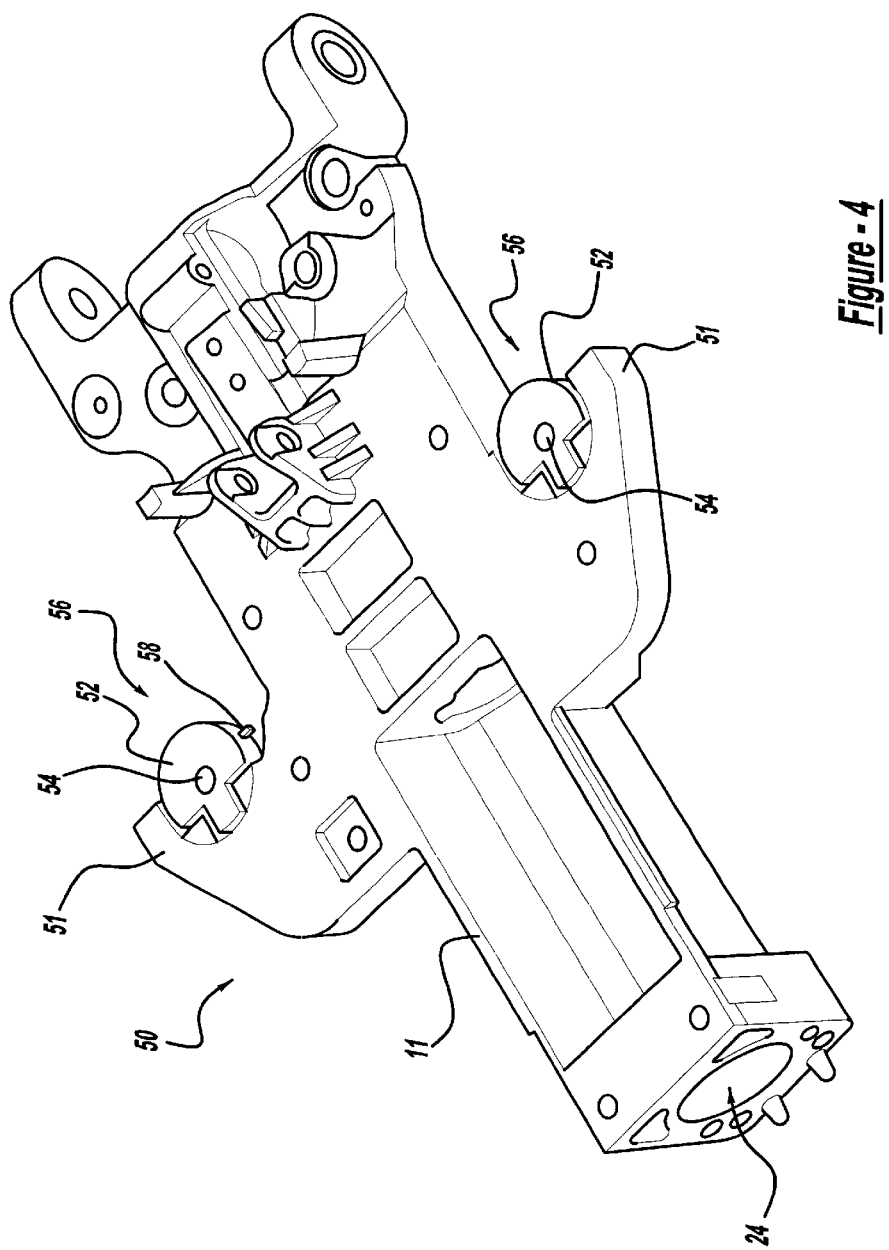
FIG. 4 is a perspective view of a mounting bracket containing two mounting areas with a second embodiment of the present invention.

Illustrated in FIG. 4 is a second embodiment of the present invention wherein like numerals designate similar elements. The mounting bracket 50 of this embodiment includes a main body 11 including a bore 24 through the main body 11 to receive a steering shaft (not shown) when fully assembled. However, this embodiment includes only rearward flanges 51 and eliminates the upper flange structures 25 of FIG. 3. Further, the center body 52 of the break-away capsules 56 have a larger size and a more distinct shape. The break-away capsules 56 still retain the break-away tabs 58. Furthermore, the size and shape of tabs 58 may be selected to obtain the desired break-away resistance. However, due to the fact that no upper flange structure is present in this embodiment the mounting bracket 50 is not hindered in its movement once the tabs 58 release.

Continuing reference to FIGS. 3 and 4 it can be seen that features from the two embodiments may be interchanged creating several variations (two are illustrated). Thus, for example, the break-away capsules 16 of FIG. 3 may be placed in the mounting bracket 50 of FIG. 4. In a second example the upper flange structure 25, as in FIG. 3, may be placed around the break-away capsules 56 of FIG. 4 and the upper flange structure 25 of the embodiment of FIG. 3 may be removed as in FIG. 4.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for mounting a steering column to a frame of an automobile that allows for release of the steering column upon an application of a certain force, comprising:

a support structure adapted to be attached to the frame of the automobile including at least first and second openings spaced apart;

a steering column mounting bracket with a main body portion, first and second flanges spaced on opposite sides of the main body portion, said flanges each including a molded break-away capsule made of the same material as the steering column mounting bracket, the molded break-away capsule including a central portion containing a hole therein and at least one tab connecting said central portion to said first and second flanges respectively, the connection between the at least one tab and each respective flange being sufficient to fix each break-away capsule to each respective flange; and said mounting bracket being mounted to said support structure by first fastener extending through said first opening and said hole in said molded capsule in said first flange and a second fastener extending through said second opening and said hole in said molded capsule in said second flange.

2. The apparatus of claim 1, wherein said break-away capsules are molded as one piece with said mounting bracket.

3. The apparatus of claim 2, wherein said break-away capsules and said mounting bracket are made of magnesium.

* * * * *